United States Patent
Kuo

(10) Patent No.: US 8,908,851 B2
(45) Date of Patent: Dec. 9, 2014

(54) SYSTEM AND METHOD FOR REDUCING POWER CONSUMPTION IN A TELECOMMUNICATIONS FACILITY

(75) Inventor: Jason T. Kuo, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 21 days.

(21) Appl. No.: 13/087,125

(22) Filed: Apr. 14, 2011

(65) Prior Publication Data

US 2012/0263294 A1    Oct. 18, 2012

(51) Int. Cl.
*H04M 7/00* (2006.01)
*H04W 52/02* (2009.01)

(52) U.S. Cl.
CPC ............ *H04W 52/0203* (2013.01); *Y02B 60/50* (2013.01); *H04Q 2213/1308* (2013.01)
USPC ..................................... 379/221.07

(58) Field of Classification Search
USPC ..................................... 379/221.07
See application file for complete search history.

(56) References Cited

U.S. PATENT DOCUMENTS

| 2007/0019624 A1* | 1/2007 | Munson et al. ............... 370/352 |
| 2007/0064880 A1* | 3/2007 | Mallya et al. .............. 379/29.01 |

* cited by examiner

*Primary Examiner* — Alexander Jamal
(74) *Attorney, Agent, or Firm* — Fay Sharpe LLP

(57) ABSTRACT

A system and method is provided for conserving electrical power in a telecommunications facility (10) containing a plurality of like electrically powered hardware resources for transporting call traffic through the facility (10). The method includes: monitoring a traffic load being experienced by the facility (10); selecting one or more of the hardware resources in response to the monitored traffic load, such that the selected hardware resources have a capacity sufficient to reliably transport the monitored traffic load thereover; and consolidating call traffic in the selected hardware resources.

18 Claims, 3 Drawing Sheets

SYSTEM AND METHOD FOR REDUCING POWER CONSUMPTION IN A TELECOMMUNICATIONS FACILITY

BACKGROUND

The present inventive subject matter relates generally to the telecommunication arts. Particular but not exclusive relevance is found in connection with conserving electrical power in telecommunications facilities, and accordingly the present specification makes specific reference thereto. It is to be appreciated however that aspects of the present inventive subject matter are also equally amenable to other like applications.

As is known in the art, telecommunication facilities (e.g., central offices (COs), mobile switching centers (MSCs), etc.) are commonly provisioned with telecommunication switches, media gateways (MGWs) and/or other electrically powered telecommunications equipment. Each switch, MGW or other like piece of equipment is commonly implemented as a collection of microprocessor containing hardware circuit boards or modules or cards which are each programmed and/or otherwise provisioned to perform one or more telecommunication functions. For example, some such cards (i.e., bearer cards) are programmed and/or provisioned to route and/or transport bearer traffic thereover, while other cards (i.e., control cards) may be programmed and/or provisioned to monitor and/or control one or more bearer cards.

As can be appreciated, each bearer card is capable of handling some maximum amount of traffic and each control card is capable of monitoring and controlling some maximum number of bearer cards. Accordingly, the maximum amount of traffic a given switch or MGW or other like piece of equipment can handle is directly related to the number of bearer and/or control cards which are installed and operational therein. Furthermore, the maximum amount of traffic a given facility can handle is directly related to the number of pieces and capacity of the equipment installed therein.

To maintain high reliability at all times, a telecommunications facility is commonly provisioned with a sufficient capacity to handle a maximum traffic load which corresponds to some projected or other determined peak usage of the facility. Accordingly, the number and/or capacity of the switches, MGWs and/or other like equipment installed in the facility has to be sufficient to support the desired maximum capacity of the facility and hence the number and/or capacity of the respective hardware cards must likewise be sufficient. However, as can be appreciated, a relatively greater number of hardware cards and/or pieces of equipment that are operational within a given facility generally translates into a relatively greater electrical power consumption for that facility.

Energy conservation is a growing concern for operators of telecommunications facilities. Reducing electrical power consumption in such facilities can reduce operating costs and can be environmentally friendly. However, there can be difficulties associated with reducing electrical power consumption in legacy telecommunications equipment already deployed or otherwise in service and the manufacture of new more energy efficient equipment.

For example, one way to conserve energy is to reduce the number of pieces and/or the capacity of the switching and/or other electrically powered equipment installed within a given facility. However, this would also tend to reduce the maximum capacity of the facility to handle traffic, and during periods of peak usage, the facility may potentially become overloaded. Alternately, some switching equipment otherwise installed at a given facility could be turned off at times (e.g., when traffic at the facility is lower) to reduce the overall electrical power consumption of that facility. However, prior art switching equipment, MGWs and the like typically can only be powered-off manually, that is for example, by a technician or other appropriate personnel manually throwing a switch or otherwise manually disconnecting power from the piece of equipment one wishes to power down. However, the technician may not know when traffic is low enough to safely power-off some of the equipment or how much of the equipment can be safely powered-off without jeopardizing the facility's reliability. Also, it can be inconvenient, costly and/or otherwise impractical to man a facility for this purpose.

Accordingly, a new and/or improved system and/or method for conserving electrical power within a telecommunications facility is disclosed which addresses the above-referenced problem(s) and/or others.

SUMMARY

This summary is provided to introduce concepts related to the present inventive subject matter. This summary is not intended to identify essential features of the claimed subject matter nor is it intended for use in determining or limiting the scope of the claimed subject matter.

In accordance with one embodiment, a method is provided for conserving electrical power in a telecommunications facility containing a plurality of like electrically powered hardware resources for transporting call traffic through the facility. The method includes: monitoring a traffic load being experienced by the facility; selecting one or more of the hardware resources in response to the monitored traffic load, such that the selected hardware resources have a capacity sufficient to reliably transport the monitored traffic load thereover; and consolidating call traffic in the selected hardware resources.

In accordance with another embodiment, a telecommunications facility includes: a plurality of like hardware resources that selectively transport call traffic thereover; and a functional entity. The functional entity is operative to: monitor a traffic load being experienced by the facility; select one or more of the hardware resources in response to the monitored traffic load, such that the selected hardware resources have a capacity sufficient to reliably transport the monitored traffic load thereover; and consolidate call traffic in the selected hardware resources thereby freeing non-selected hardware resources from the burden of transporting call traffic thereover.

Numerous advantages and benefits of the inventive subject matter disclosed herein will become apparent to those of ordinary skill in the art upon reading and understanding the present specification.

BRIEF DESCRIPTION OF THE DRAWING(S)

The following detailed description makes reference to the figures in the accompanying drawings. However, the inventive subject matter disclosed herein may take form in various components and arrangements of components, and in various steps and arrangements of steps. The drawings are only for purposes of illustrating exemplary and/or preferred embodiments and are not to be construed as limiting. Further, it is to be appreciated that the drawings may not be to scale.

DETAILED DESCRIPTION OF THE EMBODIMENT(S)

For clarity and simplicity, the present specification shall refer to structural and/or functional elements, relevant standards and/or protocols, and other components that are commonly known in the art without further detailed explanation as to their configuration or operation except to the extent they have been modified or altered in accordance with and/or to accommodate the preferred embodiment(s) presented herein.

Figure 1:
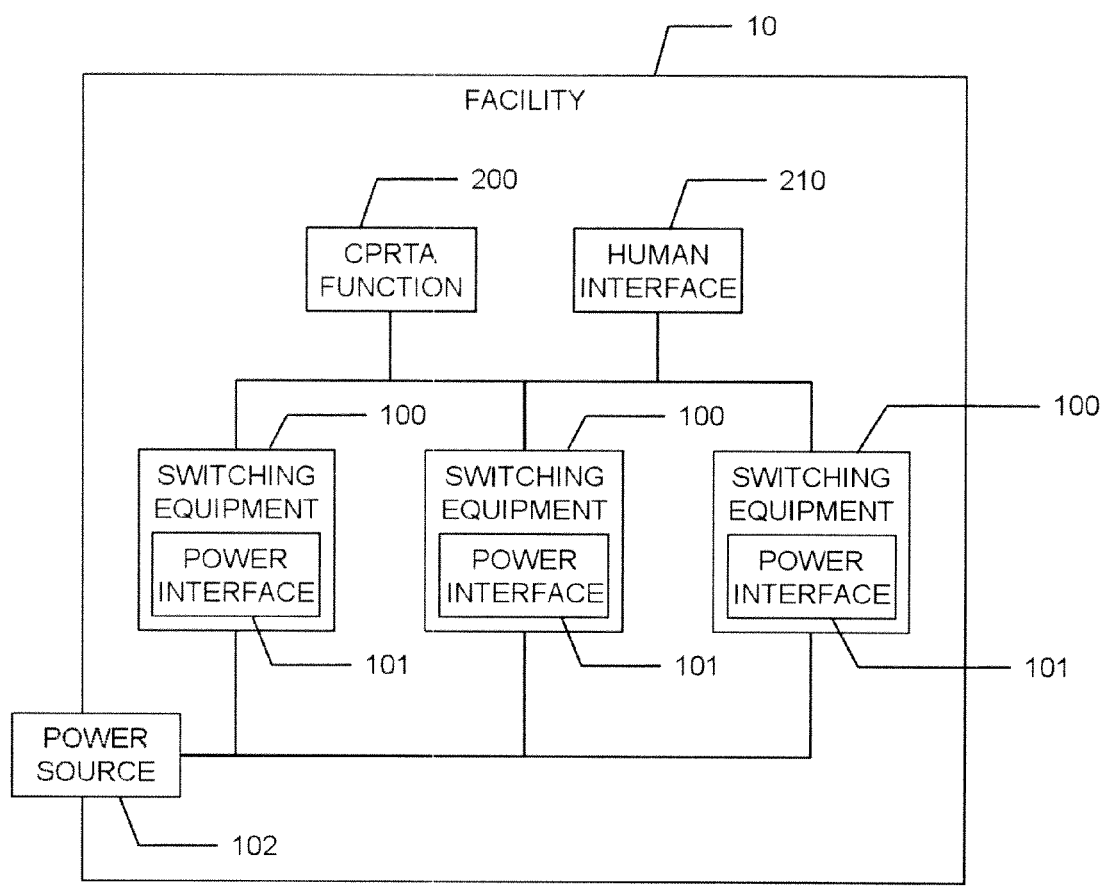
FIG. 1 is a diagrammatic illustration showing a telecommunications facility suitable for practicing aspects of the present inventive subject matter.

With reference now to FIG. 1, there is shown an exemplary telecommunications facility 10. In one suitable embodiment, the facility 10 may be a central office (CO). However, the facility 10 may alternately be a mobile switching center (MSC) or any other suitable telecommunications facility. Suitably, the facility 10 is equipped with and/or operatively connected to one or more like pieces of telecommunications switching equipment 100, i.e., one or more pieces of equipment 100 having a like or similar function. In the illustrated embodiment, the facility 10 is equipped with and/or operatively connected to three like pieces of equipment 100. However, in practice, the facility 10 may be equipped with more or fewer like pieces of equipment 100.

In one suitable embodiment, for example, in the case where the facility 10 is an MSC, each piece of equipment 100 may be a media gateway (MGW) 100. Alternately, in the case where the facility 10 is a CO, each piece of equipment 100 may be telecommunications switch, e.g., a Class 5 switch, such as the 5ESS available from Alcatel-Lucent, or another Signaling System 7 (SS7) switch, or the like. In any event, each piece of equipment 100 is selectively powered with electricity from a suitable electric power source 102, e.g., such as a battery, a generator, electrical mains or domestic or line power, etc. It is to be appreciated that while FIG. 1 shows the equipment 100 co-located and/or arranged within the facility 10 (e.g., as may be the case when the facility 10 is a CO and the pieces of equipment 100 are telecommunications switches), optionally, the equipment 100 may in practice be remotely located with respect to the facility 10 (e.g., as may be the case when the facility 10 is a MSC and the pieces of equipment 100 are MGWs).

Figure 2:
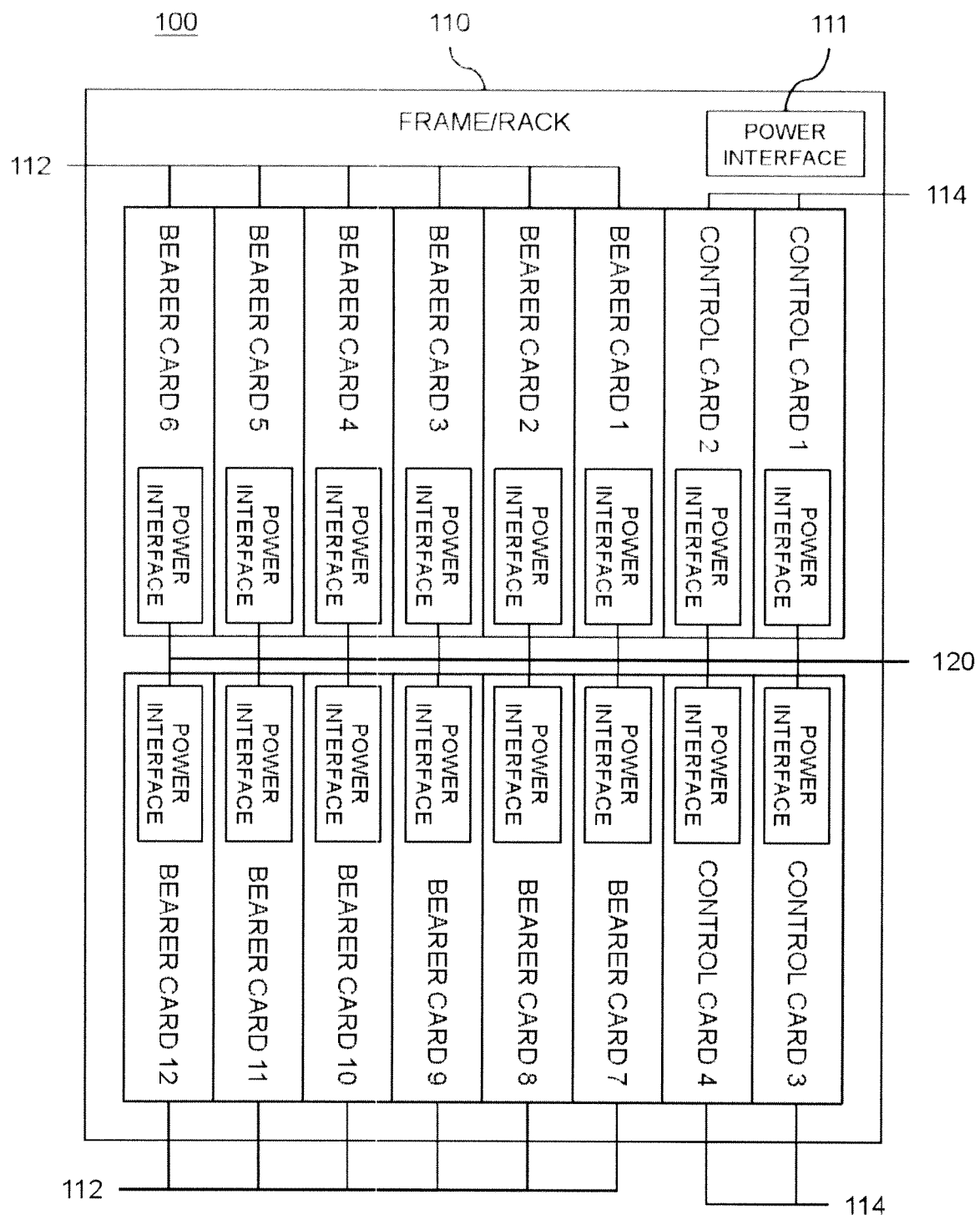
FIG. 2 is a diagrammatic illustration showing an exemplary implementation of a piece of telecommunications equipment in accordance with aspects of the present inventive subject matter.

With reference now to FIG. 2, there is shown an exemplary piece of equipment 100 implemented as one or more microprocessor containing hardware circuit boards or modules or cards carried in and/or mounted to a rack or frame 110. Each card is programmed and/or otherwise provisioned to perform one or more telecommunication functions. Suitably, some such cards (i.e., bearer cards 112) may be programmed and/or provisioned to route and/or transport bearer traffic thereover, while other cards (i.e., control cards 114) may be programmed and/or provisioned to monitor and/or control one or more bearer cards 112. The transport and/or routing of bearer traffic over the bearer cards 112 generally refers to the transport and/or routing of user information (e.g., voice, data, video, etc.) ultimately intended to be exchanged between end user terminals (e.g., telephones, mobile stations, etc.) of customers or end users, as opposed to signaling information or traffic. While a given number of bearer cards 112 and control cards 114 are illustrated for purposes of the present example, it is to be appreciated that in practice more or fewer of either type of card may be installed and/or mounted within a given frame 110. Moreover, while the piece of equipment 100 has been illustrated as being implemented within a single frame 110, in practice, a piece of equipment 100 may be implemented via multiple frames 110 containing one or more of the respective hardware cards. In any event, suitably, the bear cards 112 are operatively interconnected with one another such that the call traffic may be routed and/or transferred therebetween.

With reference again to FIG. 1, suitably, the pieces of equipment 100 are also operatively interconnected with one another such that call traffic may be routed and/or transferred therebetween. In practice, a Call Processing Routing and Terminal Allocation (CPRTA) function 200 is provided to: (i) monitor the traffic load and/or call routing over the equipment 100 and/or the hardware cards installed therein; and (ii) allocate hardware resources to be used for selected call traffic, i.e., so that each call is routed and/or otherwise transported over a designed bearer card 112 within a designated piece of equipment 100. Suitably, the CPRTA function 200 may be implemented as a "call control" or the like running a suitable software program or other application that performs the desired hardware monitoring and executes appropriate hardware allocation for call routing. For example, the CPRTA function 200 is optionally carried out and/or executed by one or more of the control cards 114 installed in the equipment 100.

As shown in FIG. 1, the facility 10 is also optionally equipped with a human interface 210. The human interface 210 includes a monitor and/or display or other suitable output device that provides visible and/or other human perceivable signals and/or indicators which convey information related to the state and/or status of the equipment 100. For example, the traffic load carried over any given piece of the equipment 100 or over any given hardware card therein may be monitored by the CPRTA function 200 and reported and/or otherwise output via the human interface 210. While the human interface 210 is illustrated within the facility 10, it is to be appreciated that the interface 210 in practice may be remotely located with respect to the facility 10.

Figure 3:
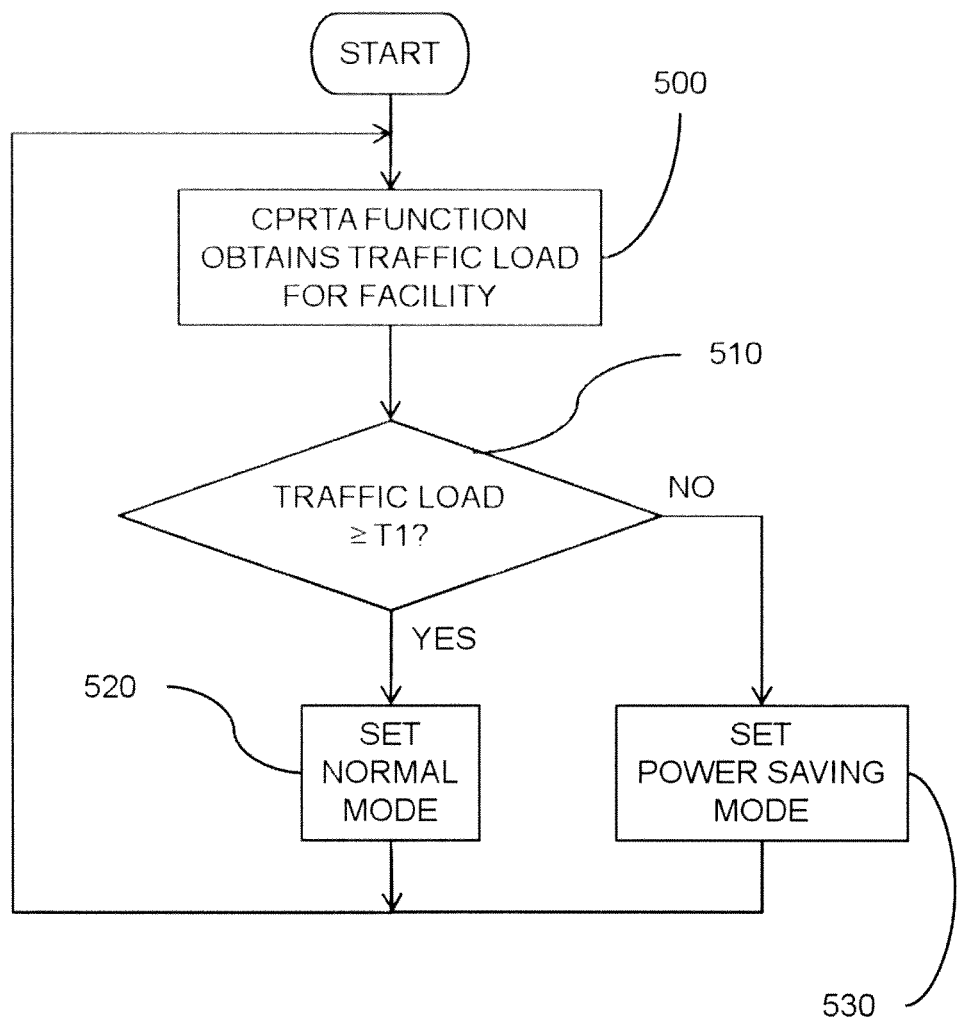
FIG. 3 is a flow chart showing an exemplary mode selection process for a telecommunications facility in accordance with aspects of the present inventive subject matter.

Optionally, the facility 10 operates in one of two modes. For illustrative purposes herein, these modes shall be referred to nominally as a normal mode and a power saving mode. As shown in FIG. 3, selection of one of the two modes is suitably made automatically based on and/or in response to an overall traffic load being experienced by the facility 10 at a given time, e.g., as measured and/or monitored by the CPRTA function 200. For example, if the traffic going through the facility 10 is at or above some threshold T1 (e.g., sufficiently near the peak or maximum capacity of the facility 10), then the facility 10 is suitably set to operate in the normal mode. Alternately, if the traffic going through the facility 10 is relatively moderate or low (e.g., below the aforementioned threshold T1), then the facility is suitably set to operate in the power saving mode.

More specifically, at step 500, the CPRTA function 200 measures or otherwise obtains the overall traffic load being experienced by the facility 10 (e.g., the total traffic volume over all the equipment 100). Next, at decision step 510, the traffic load obtained in step 500 is compared to the threshold T1. If the traffic load meets or exceeds T1 (e.g., within some tolerance), then the facility 10 is set to operate in the normal mode at step 520. Otherwise, if the traffic load is less than T1 (e.g., again within some tolerance), then the facility 10 is set to operate in the power saving mode at step 530. Suitably, as shown, the process then repeats to dynamically reset the mode periodically or intermittently in accordance with changes in the monitored traffic volume.

When in the normal mode, suitably, the CPRTA function 200 is programmed, provisioned and/or otherwise operates to balance the call traffic substantially equally over all the operative equipment 100 for the facility 10 and/or substantially equally over all the operative hardware cards installed in the operative equipment 100. Alternately, when in the power saving mode, the CPRTA function 200 is suitably programmed, provisioned and/or otherwise operates to consolidate the existing traffic in selected equipment 100 and/or hardware cards thereby freeing other (non-selected) equipment 100 and/or hardware cards (i.e., those not carrying any traffic) to be powered off or down, e.g., into a power saving state or status.

Suitably, powering-off or powering-down a piece of equipment 100 and/or a hardware card installed therein results in an interruption or reduction of the electrical power supplied thereto (e.g., from the power source 102), thereby causing the affected piece of equipment 100 or affected hardware card to become largely inoperative, e.g., for its primary function. In other words, powering-off or powering-down may result in a complete elimination of electrical power consumption by the affected element(s). Alternately, powering-off or powering-down a piece of equipment 100 or a hardware card may place the affected element in a standby, idle or sleep state (i.e., a power saving state) in which the affected element is largely inoperative (e.g., for its primary purpose), but where some relatively small or reduced residual electrical power consumption may remain, e.g., to support adjunct or secondary functions of the element.

In one suitable embodiment, to consolidate the traffic, the CPRTA function 200 monitors and/or otherwise measures the current traffic volume for the facility 10 and determines a minimum number and/or capacity of hardware resources (i.e., pieces of equipment 100 and/or hardware cards) that will be needed to safely and/or reliably accommodate the current monitored and/or otherwise measured traffic load. Accordingly, identified hardware resources (i.e., equipment 100 and/or particular hardware cards installed therein) with sufficient capacity to safely and/or reliably handle the measured traffic volume are allocated by the CPRTA function 200 to be used for the current traffic, and traffic being carried over non-allocated hardware resources is transferred to the allocated hardware resources. As can be appreciated, suitably the capacity of the allocated hardware resources is somewhat greater than the exact current traffic volume to allow for some fluctuations and/or spikes in the call traffic volume without loss of reliability. In any event, after any call traffic has been transferred from non-allocated hardware resources to allocated hardware resources, some or all of the non-allocated hardware resources can be safely powered off or down without affecting any end users or customers, i.e., insomuch as the non-allocated hardware resources are no longer carrying or transporting any call traffic.

Suitably, when in the power saving mode, the allocation of hardware resources and/or consolidation of call traffic therein is dynamically executed and/or adjusted automatically by the CPRTA function 200 based on and/or in response to the level and/or changes in the monitored traffic volume being experienced by the facility 10 and/or the associated equipment 100. For example, when in the power saving mode, if the monitored call traffic load decreases by a sufficient or threshold amount, then the CPRTA function 200 may further consolidate the existing traffic into yet fewer hardware resources, thereby freeing yet further hardware resources to be powered off or down, e.g., into a power saving state. Conversely, when in the power saving mode, if the monitored call traffic load increases by a sufficient or threshold amount, then the CPRTA function 200 may allocate additional hardware resources (e.g., selected from the pool of then unused or otherwise non-allocated hardware resources) to accommodate the increase in traffic. In either event, when the facility 10 is in the power saving mode, the number and/or capacity of the hardware resource that are allocated for carrying call traffic at any given time is suitably maintained at a minimum level by the CPRTA function 200, while still retaining a sufficient number and/or capacity of allocated hardware resources to safely and reliably handle the monitored call traffic volume for the facility 10. Accordingly, electrical power savings can be maximized without loss of reliability by maximizing the amount of non-allocated hardware resources (i.e., non-traffic bearing hardware resources) available for powering off or down at any given time.

In one suitable embodiment, the CPRTA function 200 is programmed, provisioned and/or otherwise operates to balance the traffic load substantially evenly or equally over all the allocated hardware resources, even when the facility 10 is in the power saving mode. That is to say, the traffic load is substantially balanced over all the currently allocated hardware resources, while non-allocated resources remain free of traffic so that they can be selectively powered off or down.

In one suitable embodiment, the equipment 100 and/or the frames 110 therefor and/or the hardware cards installed therein may be configured and/or provisioned for manual power selection. For example, each may have a switch or button or other like selector which has to be manually toggled or otherwise manipulated to select a power or operational state for the element, i.e., either turned on (such that the element is fully operational and receiving electrical power therefor) or turned off or powered down. Optionally therefore, the human interface 210 identifies at any given time which equipment 100 and/or hardware cards can be safely powered off or down without affecting customer service, e.g., which hardware resources are not allocated for or otherwise presently carrying or transporting call traffic. A technician may then obtain the information provided by the human interface 210 and manually power off or down some or all of those hardware resources (be it entire pieces of equipment 100 or particular hardware cards within a piece of equipment 100 or entire frames 110 within a piece of equipment 100) that are not allocated or not otherwise engaged in transporting call traffic, thereby achieving an electrical power savings without risking loss of reliability. Suitably, the human interface 210 is dynamically updated based upon and/or in response to the level and/or changes in the traffic volume, e.g., as measured or monitored by the CPRTA function 200. For example, if call traffic should decrease, the human interface 210 (e.g., informed by the CPRTA function 200) reflects de-allocation of hardware resources as traffic becomes further consolidated automatically by the CPRTA function 200 into fewer hardware resources. Accordingly, the technician is made aware of which hardware resources may be safely turned off or powered down without risking loss of facility reliability or affecting customer service. Conversely, if the call traffic through the facility 10 or equipment 100 should rise, then the human interface 210 may inform or otherwise signal the technician to manually turn on additional hardware resources to accommodate increasing call traffic.

In another alternate embodiment, the equipment 100 and/or the frames 110 therefor and/or the hardware cards installed therein may be provided with a suitable interface that allows automatic power selection. For example, each may be configured with a software/hardware interface that allow for the automatic selection or setting of the power or operational state for the element, i.e., either turned on (such that the element is fully operational and receiving electrical power therefor) or turned off or powered down. With specific reference to FIG. 2, for example, each hardware card may have such an interface (indicated generally by reference numeral 120) that can be used to automatically select or set the power or operational state of its respective card, and/or the frame 110 may have such an interface (indicated generally by reference numeral 111) that can be used to automatically select or set the power or operational state of the entire frame 110. Likewise, with specific reference to FIG. 1, each piece of equipment 100 may have such an interface (indicated generally by reference numeral 101) that can be used to automatically select or set the power or operational state of the entire piece of equipment 100.

Suitably, the power or operational state of a given frame 110 limits the power or operational state of any hardware card installed therein and the power or operational state of any piece of equipment 100 limits the power or operational state of any frame 110 therefor. That is to say, if a frame 110 is powered off or down, then each hardware card installed therein will also be powered off or down (i.e., insomuch as the installed hardware cards receive their power through the frame 110), and likewise if a piece of equipment 100 is powered off or down, then each frame 110 therefor will also be powered off or down.

Returning attention to the aforementioned alternate embodiment, based on and/or in response to the particular allocation of hardware resources and/or the consolidation of call traffic therein carried out by the CPRTA function 200, some or all of the non-allocated or non-traffic bearing pieces of equipment 100 and/or frames 110 therefor and/or hardware cards therein are automatically powered off or down using the respective interface (be it interface 101, 111 or 120 as the case may be). That is to say, based on and/or in response to the monitored call traffic load, the CPRTA function 200 allocates selected hardware resources to transport the traffic and consolidates the existing traffic in the allocated hardware resources by transferring any traffic from non-allocated hardware resources to the allocated hardware resources. This in turn frees the non-allocated hardware resources from the burden of transporting call traffic, and one or more of the non-allocated hardware resources are accordingly automatically powered off or down (e.g., via one or more of the aforementioned interfaces) to automatically achieve a corresponding electrical power savings. Suitably, the automatic power state selection of hardware resources is dynamically updated based upon and/or in response to the level and/or changes in the traffic volume, e.g., as measured or monitored by the CPRTA function 200. For example, if call traffic should decrease (i.e., as monitored by the CPRTA function 200), then there will be a resulting de-allocation of hardware resources as traffic becomes further consolidated automatically by the CPRTA function 200 into fewer hardware resources. Accordingly, additional non-allocated or non-traffic bearing hardware resources will be automatically turned off or powered down (e.g., via one or more of the appropriate interfaces 101, 111 and/or 120) without risking loss of facility reliability or affecting customer service. Conversely, if the call traffic through the facility 10 and/or the associated equipment 100 should rise (i.e., as monitored by the CPRTA function 200), then informed by this increase, additional hardware resources (e.g., selected from the pool of then non-allocated or non-traffic bearing hardware resources) will be automatically turned on (e.g., via one or more of the appropriate interfaces 101, 111 and/or 120) to accommodate the increasing call traffic.

In any event, it is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method for conserving electrical power in a telecommunications facility containing a plurality of like electrically powered hardware resources for transporting call traffic through the facility, said method comprising:
   (a) monitoring a traffic load being experienced by the facility;
   (b) selecting one or more of the hardware resources in response to the monitored traffic load, such that the selected hardware resources have a capacity sufficient to reliably transport the monitored traffic load thereover; and
   (c) consolidating call traffic in the selected hardware resources, such that one or more non-selected hardware resources are left without any traffic being carried thereover.

2. The method of claim 1, wherein said consolidating comprises:
   transferring call traffic from non-selected hardware resources to selected hardware resources.

3. The method of claim 2, further comprising:
   (d) powering down one or more non-selected hardware resources such that electrical power consumption by a powered down hardware resource is at least one of interrupted or reduced.

4. The method of claim 2, wherein the facility is a mobile switch center.

5. The method of claim 4, wherein the hardware resources are media gateways.

6. The method of claim 2, wherein the facility is a central office.

7. The method of claim 6, wherein the hardware resources are telecommunication switches.

8. The method of claim 2, wherein each hardware resource is a distinct hardware module with a set capacity to transport call traffic thereover, and a plurality of the hardware modules are combined into a piece of telecommunications equipment.

9. The method of claim 3, wherein the step (d) is automatically executed.

10. The method of claim 2, further comprising:
(d) providing a human perceivable output which identifies non-selected hardware resources available for powering down such that electrical power consumption by a powered down hardware resources is at least one of interrupted or reduced.

11. The method of claim 2, further comprising:
dynamically altering the selection of hardware resources and consolidation of traffic therein in response to the monitored traffic load.

12. The method of claim 11, wherein as the monitored traffic load decreases, fewer hardware resources are selected and call traffic is further consolidated in the fewer selected hardware resources thereby freeing more non-selected hardware resources from the burden of transporting call traffic thereover.

13. The method of claim 11, wherein as the monitored traffic load increases, more hardware resources are selected to raise the capacity of the selected hardware resources and accommodate said increase.

14. A telecommunications facility comprising:
a plurality of like hardware resources that selectively transport call traffic thereover; and
a functional entity operative to:
(i) monitor a traffic load being experienced by the facility;
(ii) select one or more of the hardware resources in response to the monitored traffic load, such that the selected hardware resources have a capacity sufficient to reliably transport the monitored traffic load thereover; and
(iii) consolidate call traffic in the selected hardware resources thereby freeing non-selected hardware resources from the burden of transporting call traffic thereover, such that one or more non-selected hardware resources are left without any traffic being carried thereover.

15. The telecommunications facility of claim 14, further comprising:
a human perceivable output which identifies non-selected hardware resources available for powering down such that electrical power consumption by a powered down hardware resources is at least one of interrupted or reduced.

16. The telecommunications facility of claim 14, wherein one or more of the hardware resources includes a power state selection interface that allows a power state of the hardware resource to be automatically selected from at least one of a powered on state in which the hardware resource is operational and receiving electrical power therefor and a powered down state in which the electrical power consumption by the hardware resource is at least one of interrupted or reduced.

17. The telecommunications facility of claim 16, wherein one or more of the hardware resources including the power state selection interface are automatically powered on and down via the interface based upon them being selected or not selected by the functional entity.

18. The telecommunications facility of claim 14, wherein the functional entity comprises a central processing unit running a software program to execute the operative monitoring, selection and consolidation.

* * * * *